(12) United States Patent
Kataoka et al.

(10) Patent No.: US 10,525,824 B2
(45) Date of Patent: Jan. 7, 2020

(54) HIGH-PRESSURE VESSEL UNIT

(71) Applicant: TOYOTA JIDOSHA KABUSHIKI KAISHA, Toyota-shi, Aichi-ken (JP)

(72) Inventors: Chiaki Kataoka, Nagakute (JP); Shinsuke Kinoshita, Toyota (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/014,372

(22) Filed: Jun. 21, 2018

(65) Prior Publication Data
US 2019/0047409 A1 Feb. 14, 2019

(30) Foreign Application Priority Data

Aug. 9, 2017 (JP) .................................. 2017-154297

(51) Int. Cl.
*B60K 15/067* (2006.01)
*F17C 1/00* (2006.01)
*F17C 1/14* (2006.01)
*F17C 1/16* (2006.01)

(52) U.S. Cl.
CPC ............ *B60K 15/067* (2013.01); *F17C 1/005* (2013.01); *F17C 1/14* (2013.01); *F17C 1/16* (2013.01); *F17C 2201/0138* (2013.01); *F17C 2201/035* (2013.01); *F17C 2205/0111* (2013.01); *F17C 2205/0146* (2013.01); *F17C 2205/0169* (2013.01); *F17C 2221/012* (2013.01); *F17C 2270/0178* (2013.01); *Y10T 137/474* (2015.04); *Y10T 137/4857* (2015.04)

(58) Field of Classification Search
CPC . B60K 15/067; F17C 1/005; Y10T 137/4857; Y10T 137/474
USPC .................................. 137/266, 263, 256, 259
See application file for complete search history.

(56) References Cited

U.S. PATENT DOCUMENTS

| 6,708,719 | B2 * | 3/2004 | Idoguchi | F17C 1/00 137/266 |
| 7,337,794 | B2 * | 3/2008 | Brigham et al. | F17D 1/04 137/1 |

(Continued)

FOREIGN PATENT DOCUMENTS

| JP | 2005-114022 A | 4/2005 |
| JP | 2008-049961 A | 3/2008 |

(Continued)

*Primary Examiner* — Kevin L Lee
(74) *Attorney, Agent, or Firm* — Oliff PLC

(57) ABSTRACT

A high-pressure vessel unit includes: plural cylindrical vessels arrayed inside a case, with end portions of the vessels on one side in the axial direction thereof being equipped with openings; a coupling member connected to the openings of the vessels to couple the plural vessels and includes a flow passage that communicates the insides of the vessels; a lead-out pipe that is leads out to the outside of the case from the coupling member through a through hole formed in the case; securing members that secure the coupling member to the case; and a retention mechanism that retains portions of the vessels on the axial direction other side of the end portions on the one side in the axial direction such that those portions of the vessels on the axial direction other side are movable in the axial direction relative to the case.

7 Claims, 11 Drawing Sheets

(56) References Cited

U.S. PATENT DOCUMENTS 7,624,753 B2 * 12/2009 Suess et al. ..... B60K 15/03006
137/259
9,689,532 B2 * 6/2017 Barbato et al. ........... F17C 5/06

FOREIGN PATENT DOCUMENTS

| JP | 2008-291891 A | 12/2008 |
| JP | 2009-214782 A | 9/2009 |

* cited by examiner

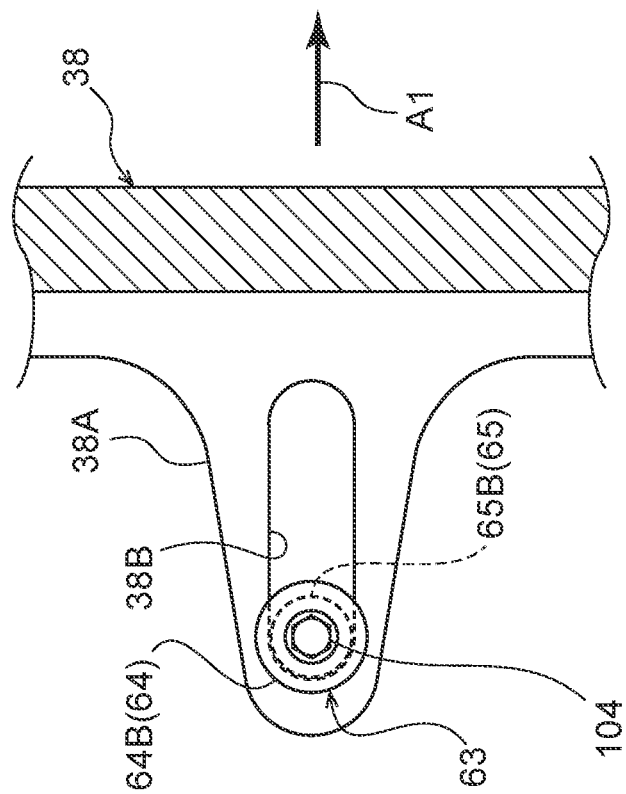
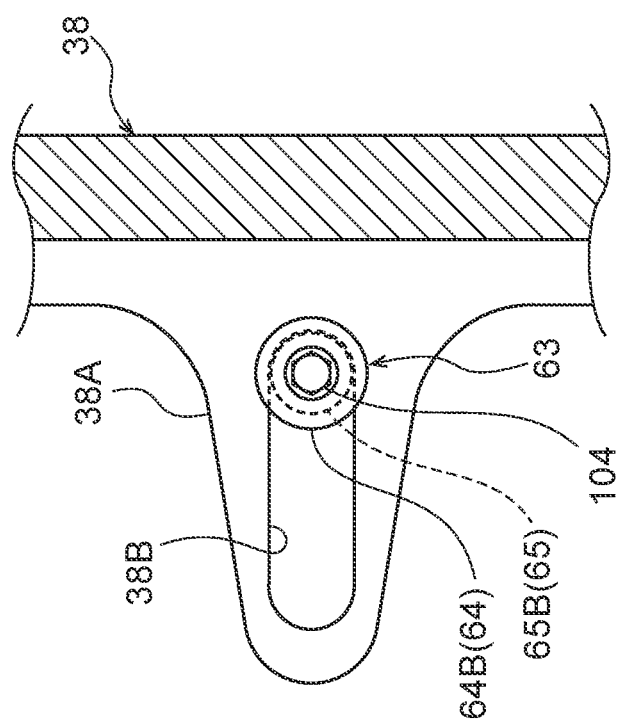

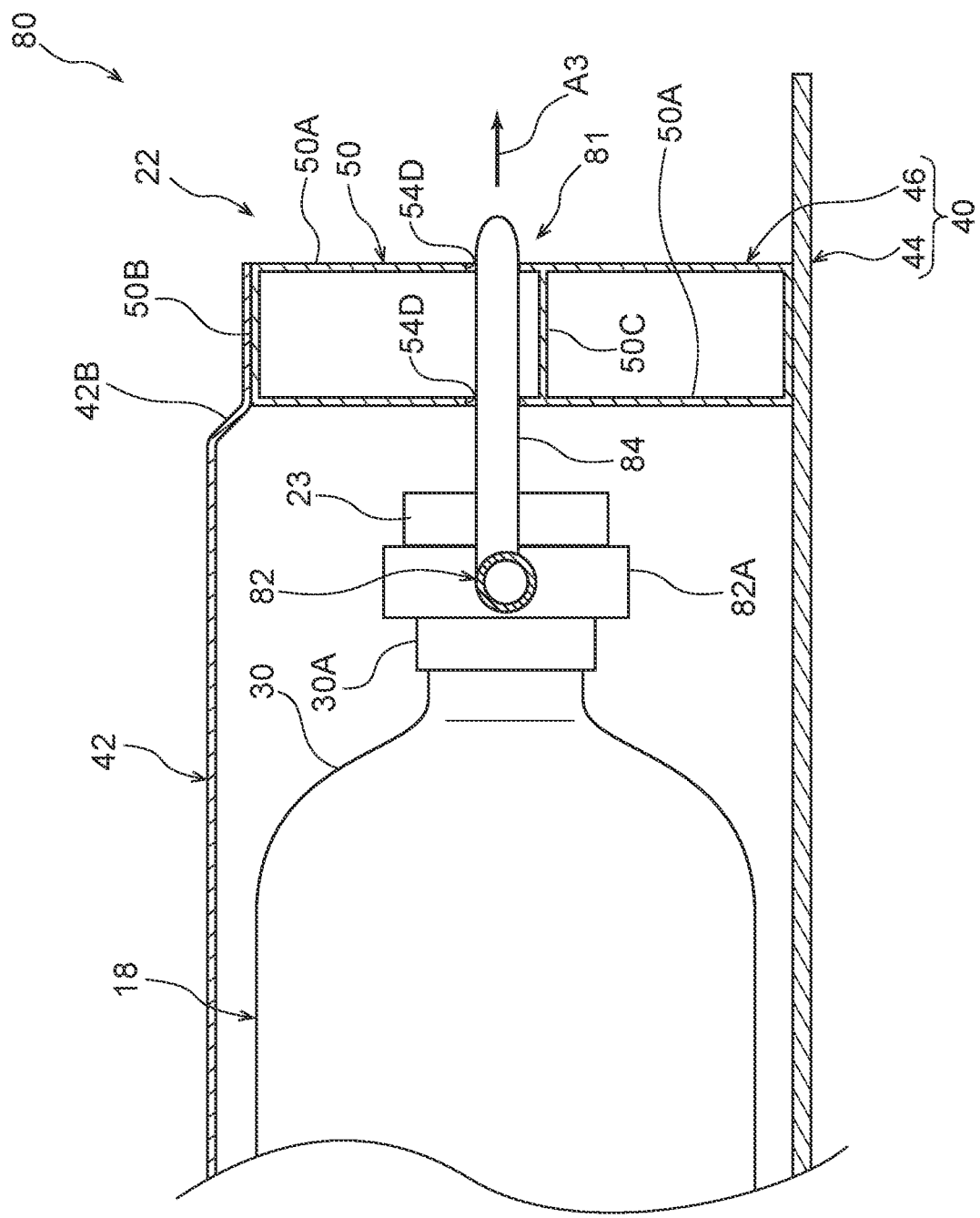

HIGH-PRESSURE VESSEL UNIT

CROSS-REFERENCE TO RELATED APPLICATION

This application claims priority under 35 USC 119 from Japanese Patent Application No. 2017-154297, filed on Aug. 9, 2017, the disclosure of which is incorporated by reference herein.

BACKGROUND

Technical Field

The present disclosure relates to a high-pressure vessel unit.

Related Art

Japanese Patent Application Laid-Open (JP-A) No. 2008-49961 discloses a structure where three vessels (tanks) are housed inside a case whose upper side is open. Furthermore, in JP-A No. 2008-49961, end portions of the vessels on a valve side are supported such that they may freely slide, while the other end portions of the vessels are secured with bolts. Accordingly, expansion (contraction) of the vessels in their axial direction is allowed. JP-A No. 2005-114022 discloses a structure where a tank has two bands wound around to secure the tank to a tank mount, with the securing force of one band near a valve being strong and with the securing force of the other band being weak.

Recently, structures in which plural vessels are installed to increase fuel capacity have been considered. Here, if plural barrel-shaped tanks disclosed in JP-A No. 2005-114022 are installed, it becomes difficult to ensure cabin space and luggage space. One way to address this issue is to house plural cylindrical vessels in a case as in JP-A No. 2008-49961. However, in JP-A No. 2008-49961, valves are provided for each of the three vessels, and the valves are coupled to each other by a pipe. Accordingly, if there are variations in how much the vessels expand (contract) in their axial direction, the load on the valves increases.

SUMMARY

The present disclosure provides a high-pressure vessel unit that may ensure capacity and may reduce the load on a valve when vessels expand or contract in their axial direction.

A first aspect of the present disclosure is a high-pressure vessel unit including: a box-like case; plural cylindrical vessels arrayed inside the case, each vessel including an opening at an end portion on one side of the vessel in the axial direction; a coupling member that connects the openings to couple the plural vessels with each other and that includes a flow passage that communicates the insides of the plural vessels with each other; a lead-out pipe that leads out to the outside of the case from the coupling member through a through hole formed in the case, the lead-out pipe being attached with a valve capable of opening and closing the flow passage; securing members that secure the coupling member to the case; and a retention mechanism that retains a portion of each of the plural vessels at an other side of the end portion of in the axial direction such that the portion of each of the plural vessels at the other side are movable in the axial direction relative to the case.

In the high-pressure vessel unit of the first aspect of the present disclosure, the cylindrical vessels are plurally arrayed inside the box-like case. Furthermore, the end portions of the vessels on the one side in the axial direction are equipped with the openings, and the coupling member is connected to the openings. The plural vessels are coupled to each other by the coupling member, whereby the insides of the vessels are communicated with each other. Moreover, the lead-out pipe is provided on the coupling member, and the valve is attached to the lead-out pipe. Because of this, the plural vessels may be unitized and may function as a single high-pressure vessel, and capacity may be ensured.

The end portions of the vessels on the one side in the axial direction are secured to the case by the securing members via the coupling member, and the portions of the vessels on the axial direction other side of the end portions on the one side in the axial direction are retained, such that they are movable in the axial direction relative to the case, by the retention mechanism. Because of this, in a case where the vessels have expanded or contracted, the portions of the vessels on the other side in the axial direction move but the end portions of the vessels on the one side in the axial direction to which the valve is connected do not move relative to the case. As a result, the load on the valve may be reduced when the vessels expand or contract in their axial direction.

In a second aspect of the present disclosure, in the first aspect, the coupling member may be a first pipe that couples the end portions of the plural vessels on the one side in the axial direction with each other; end portions of the plural vessels on the other side in the axial direction may be coupled to each other by a second pipe; and the retention mechanism may retain the second pipe such that the second pipe is movable relative to the case.

In the high-pressure vessel unit of the second aspect of the present disclosure, the second pipe is retained such that the second pipe is movable relative to the case. Accordingly, there is no need to retain the each vessels such that the vessels are individually movable.

In a third aspect of the present disclosure, in the second aspect, the retention mechanism may include: mounting brackets that are provided on the case and in which first mounting holes are formed, mounting pieces that are provided on the second pipe and in which second mounting holes are formed, and fastening members that are passed through the first mounting holes and the second mounting holes in a state in which the mounting brackets and the mounting pieces are placed on top with each other and are fastened to each other, and the first mounting holes or the second mounting holes are long holes whose longitudinal direction are aligned with the axial direction of the plural vessels.

In the high-pressure vessel unit of the third aspect of the present disclosure, the first mounting holes or the second mounting holes are long holes. Due thereto, when the vessels expand in their axial direction, the second pipe moves together with the mounting pieces toward the other side in the axial direction according to how much the vessels have expanded. Furthermore, when the vessels contract in their axial direction, the second pipe moves together with the mounting pieces toward the one side in the axial direction according to how much the vessels have contracted. In this way, the expansion or contraction of the vessels in their axial direction may be allowed.

In a fourth aspect of the present disclosure, in the third aspect, the mounting brackets and the mounting pieces may be provided between adjacent vessels.

In the high-pressure vessel unit of the fourth aspect of the present disclosure, the mounting brackets and the mounting pieces are provided between adjacent vessels. Accordingly, the size of the case may not be increased.

In a fifth aspect of the present disclosure, in the first aspect, the retention mechanism may include support bands that extend in the array direction of the plural vessels and bridge the case, and the plural vessels may be supported by the support bands such that each of the plural vessels may freely slide.

In the high-pressure vessel unit of the fifth aspect of the present disclosure, the vessels are slidably supported by the support bands. Because of this, when the vessels expand in their axial direction, the end portions of the vessels on the other side in the axial direction slide toward the other side in the axial direction according to how much the vessels have expanded. Furthermore, when the vessels contract in their axial direction, the end portions of the vessels on the other side in the axial direction slide toward the one side in the axial direction according to how much the vessels have contracted. In this way, the expansion or contraction of the vessels in their axial direction may be allowed even without the end portions of the vessels on the other side in the axial direction being coupled to each other by a pipe or the like.

In a sixth aspect of the present disclosure, in the second aspect, the retention mechanism may include: pass-through holes formed in a peripheral wall portion of the case that opposes the end portions of the vessels on the other side in the axial direction; and projecting portions that project from the second pipe and are passed through the pass-through holes such that the projecting portions are movable in the axial direction of the vessels.

In the high-pressure vessel unit of the sixth aspect of the present disclosure, the projecting portions that project from the second pipe are passed through the pass-through holes formed in the peripheral wall portion of the case. Due thereto, when the vessels expand in their axial direction, the projecting portions move toward the other side in the axial direction according to how much the vessels have expanded. That is, the pass-through length of the projecting portions becomes longer. Furthermore, when the vessels contract in their axial direction, the projecting portions move toward the one side in the axial direction according to how much the vessels have contracted. That is, the pass-through length of the projecting portions becomes shorter. In this way, the expansion or contraction of the vessels in their axial direction may be allowed.

In a seventh aspect of the present disclosure, in any one of the first to sixth aspects, the case may include: a case body equipped with a bottom wall portion and a frame-like peripheral wall portion that is erectly provided on the bottom wall portion and surrounds the periphery of the plural vessels; and a cover member.

In the high-pressure vessel unit of the seventh aspect of the present disclosure, foreign matter and so forth can be kept from entering the inside of the case body. Furthermore, the vessels may be protected also with respect to shocks from the cover member side.

According to the first aspect, the high-pressure vessel unit of the present disclosure may ensure capacity and may reduce the load on the valve when the vessels expand or contract in their axial direction.

According to the second aspect, the retention mechanism of the high-pressure vessel of the present disclosure unit does not become complex even if the number of the vessels is increased.

According to the third, fifth, and sixth aspects, the high-pressure vessel unit of the present disclosure may allow the expansion or contraction of the vessels with a simple configuration.

According to the fourth aspect, the high-pressure vessel unit of the present disclosure may allow the expansion or contraction of the vessels in their axial direction without increasing the size of the case.

According to the seventh aspect, the high-pressure vessel unit of the present disclosure may keep foreign matter from entering the case body, and may improve shock resistance performance.

BRIEF DESCRIPTION OF THE DRAWINGS

Exemplary embodiments will be described in detail based on the following figures, wherein:

FIG. 6A is an enlarged plan view of a rear mounting piece pertaining to the first exemplary embodiment, showing a state in which a vessel has contracted;

FIG. 6B is an enlarged plan view of the rear mounting piece pertaining to the first exemplary embodiment, showing a state in which the vessel has expanded;

FIG. 11 is an enlarged side view showing the rear end portion of the high-pressure vessel unit pertaining to the third exemplary embodiment.

DETAILED DESCRIPTION

[First Exemplary Embodiment]

Figure 1:
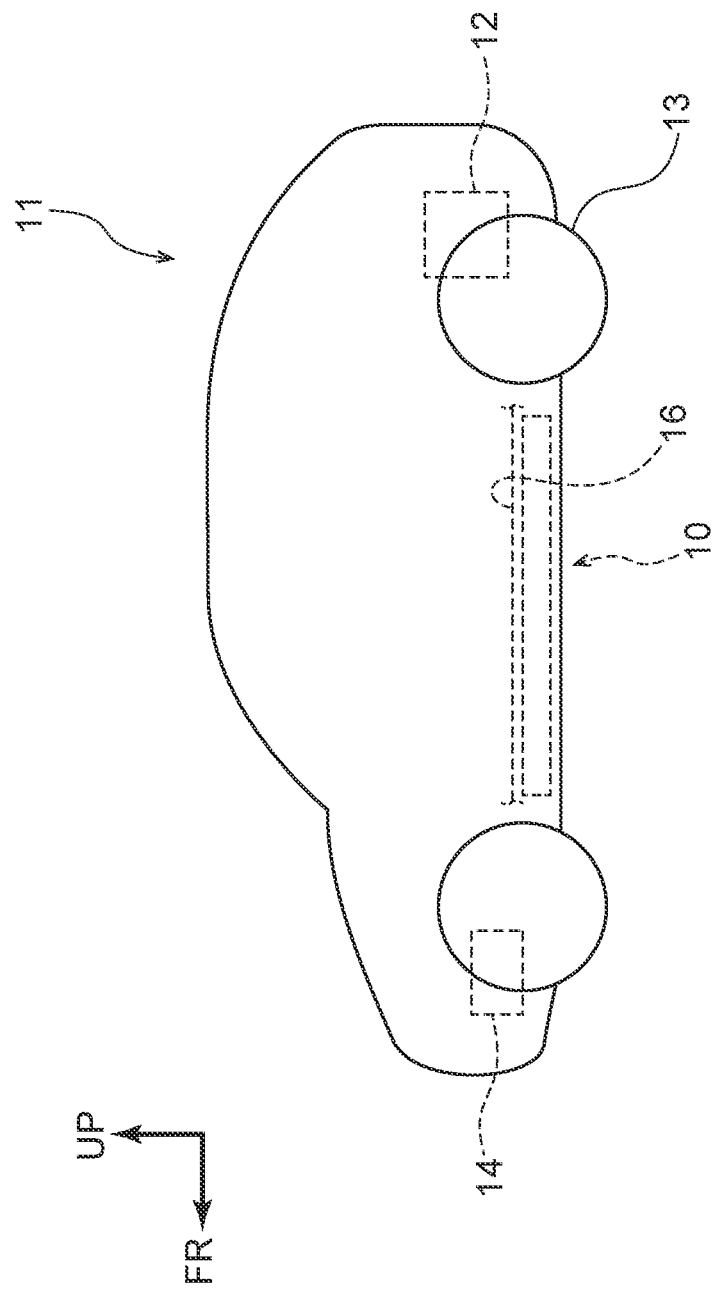
FIG. 1 is a schematic side view showing a fuel cell vehicle in which a high-pressure vessel unit pertaining to a first exemplary embodiment is installed.

A fuel cell vehicle 11 in which a high-pressure vessel unit 10 pertaining to a first exemplary embodiment is installed will be described with reference to the drawings. Note that arrow FR, arrow UP, and arrow RH appropriately shown in the drawings indicate, respectively, a forward direction, an upward direction, and a vehicle rightward direction of the fuel cell vehicle 11. When description is given below simply using the directions of front/rear, upper/lower, and right/left, unless otherwise specified these will be intended to mean front/rear in the vehicle front and rear direction, upper/lower in the vehicle up and down direction, and right/left in the vehicle width direction when facing the traveling direction.

As shown in FIG. 1, the fuel cell vehicle 11 (hereinafter appropriately called "the vehicle 11") equipped with the high-pressure vessel unit 10 pertaining to the present exemplary embodiment includes a drive motor 12, a fuel cell stack 14, and the high-pressure vessel unit 10.

In the present exemplary embodiment, as one example, the drive motor 12 is disposed in the vehicle rear portion. The drive motor 12 is configured such that, when it is made to drive, the output from the drive motor 12 is transmitted to rear wheels 13 via a transmission mechanism not shown in the drawings.

Furthermore, the fuel cell stack 14 is provided in the vehicle front portion. The fuel cell stack 14 has a stack structure in which plural single cells that are constituent units are stacked on top of each other. The fuel cell stack 14 functions as a high-voltage drive source. Each of the single cells configuring the fuel cell stack 14 generates electrical power by an electrochemical reaction between hydrogen gas supplied from the high-pressure vessel unit 10 and compressed air supplied from an air compressor (not shown in the drawings). Furthermore, a storage battery (not shown in the drawings) is provided in the vehicle 11. The storage battery is a dischargeable and chargeable battery, and, for example, a nickel-hydrogen secondary battery or a lithium-hydrogen secondary battery is used. The drive motor 12 drives, as a result of electrical power being supplied from the storage battery to the drive motor 12, and regenerative power is recovered from the drive motor 12 during deceleration regeneration.

The high-pressure vessel unit 10 is disposed on the vehicle underside of a floor panel 16 configuring the floor of the cabin. Furthermore, as shown in FIG. 2, the high-pressure vessel unit 10 includes plural vessels 18, a first pipe 20 serving as a coupling member, a second pipe 21, a case 22, and a lead-out pipe 32.

Figure 3:
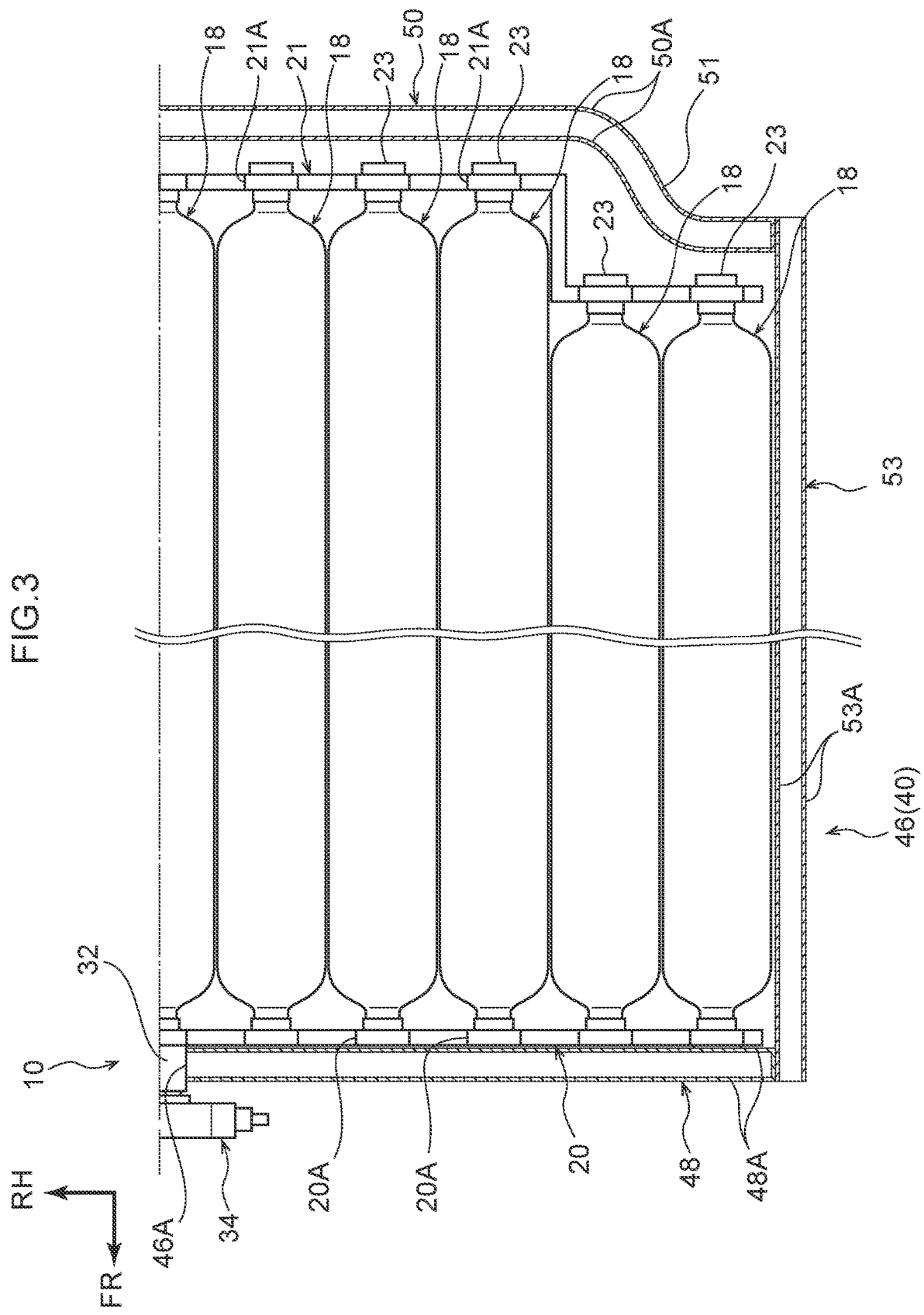
FIG. 3 is a plan sectional view of the high-pressure vessel unit pertaining to the first exemplary embodiment and shows just the half on the vehicle left side.

As shown in FIG. 3, the vessels 18 are each formed in a long substantially cylindrical shape whose axial direction is aligned with the longitudinal direction, and the plural vessels 18 are arrayed adjacent to each other. In the present exemplary embodiment, as one example, eleven vessels 18 are disposed at regular intervals in the vehicle width direction such that their axial direction is aligned with the vehicle front and rear direction (in FIG. 3, just the half on the vehicle left side is shown for convenience of description, so that six vessels 18 are shown).

Furthermore, the positions of the vehicle front-side end portions of the eleven vessels 18 are aligned with each other, and the seven vessels 18 on the vehicle central side are formed so as to have the same lengths in their axial direction. In contrast, the vehicle front and rear direction (axial direction) lengths of the two vessels 18 on the vehicle left side and the two vessels 18 on the vehicle right side are formed shorter in comparison with the vehicle front and rear direction (axial direction) lengths of the other vessels 18. For this reason, the rear end portions of these four vessels 18 are positioned more in the vehicle forward direction than the rear end portions of the other vessels 18.

Figure 2:
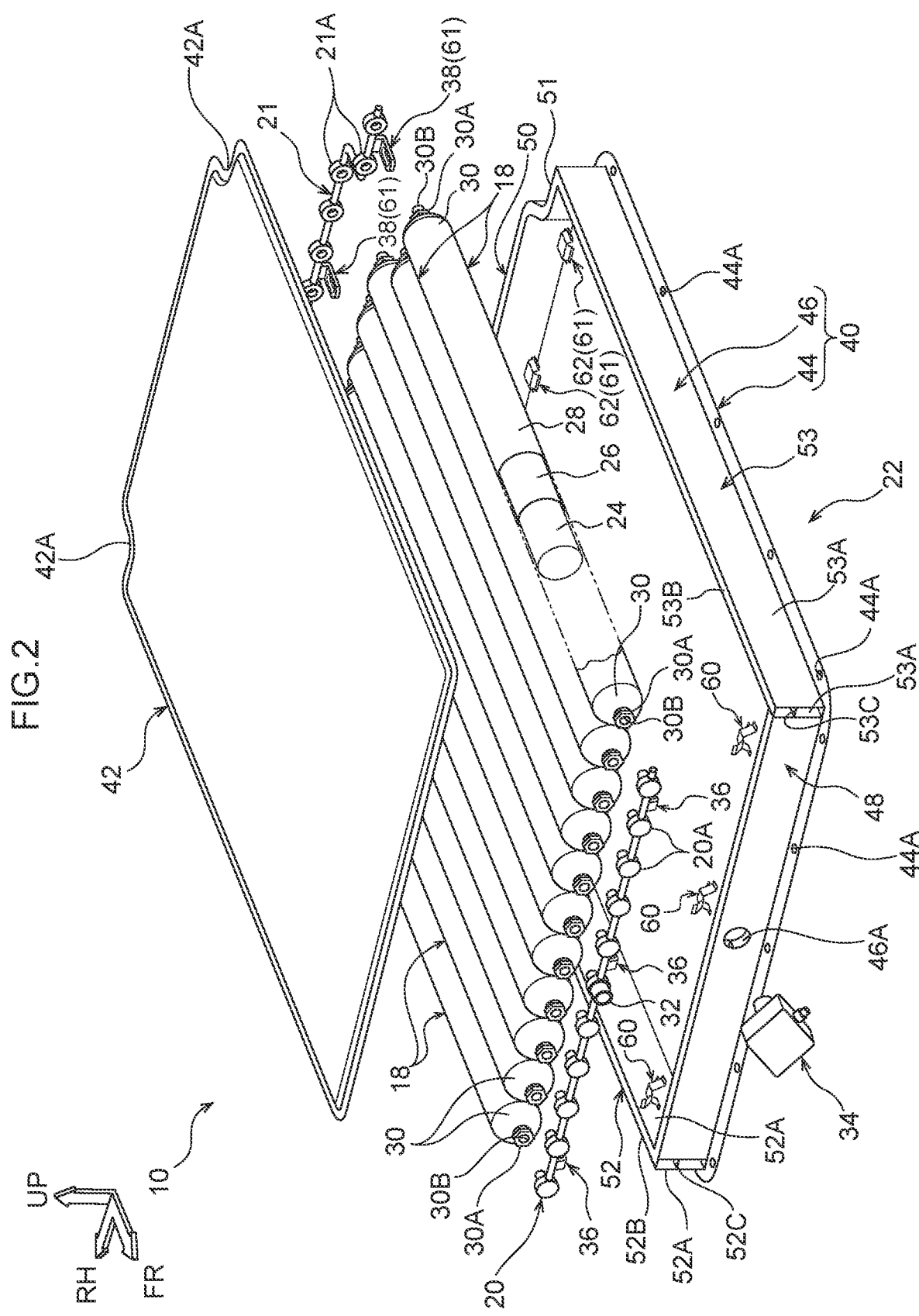
FIG. 2 is an exploded perspective view of the high-pressure vessel unit pertaining to the first exemplary embodiment.

As shown in FIG. 2, the vessels 18 are each configured to include a shell portion 24, caps 30, a first reinforcement layer 26, and a second reinforcement layer 28. The shell portion 24 is formed in a cylindrical shape whose axial direction end portions are open. In the present exemplary embodiment, as one example, the shell portion 24 is configured by aluminum alloy.

The caps 30 are provided on both axial direction end portions of the shell portion 24. The caps 30 are each formed in a substantially dome-like shape with axial direction is aligned with the vehicle front and rear direction and which becomes convex outward in the axial direction of the shell portion 24. Both end portions of the shell portion 24 are plugged by the caps 30. Note that, in the present exemplary embodiment, the cap 30 on the vehicle front end side and the cap 30 on the vehicle rear end side have the same configuration. Furthermore, connecting portions 30A are disposed projecting outward in the axial direction from distal end portions of the caps 30, and the connecting portions 30A are equipped with openings 30B. The first pipe 20 and the second pipe 21 described later are connected to the openings 30B.

The first reinforcement layer 26 is provided on the outer peripheral surface of the shell portion 24. The first reinforcement layer 26 is formed of carbon fiber-reinforced plastic (CFRP). Specifically, the first reinforcement layer 26 is formed by winding a sheet of carbon fiber-reinforced plastic impregnated with a thermosetting resin such as an epoxy resin around the outer peripheral surface of the shell portion 24 and heating the sheet. Here, though not shown in the drawings, the fiber direction of the first reinforcement layer 26 is aligned with the circumferential direction of the shell portion 24.

The second reinforcement layer 28 is provided on the outer peripheral surface of the first reinforcement layer 26. The second reinforcement layer 28 is formed of carbon fiber-reinforced plastic. Specifically, the second reinforcement layer 28 is formed by winding CFRP filaments impregnated with a thermosetting resin such as an epoxy resin around the outer peripheral surfaces of the first reinforcement layer 26 and the caps 30 and heating the filaments. For this reason, though not shown in the drawings, the fiber direction of the second reinforcement layer 28 is aligned with the axial direction of the shell portion 24 or is inclined a predetermined angle relative to the axial direction.

The vessels 18 configured as described above are coupled to each other in the vehicle width direction by the first pipe 20 and the second pipe 21. The first pipe 20 is a long tube that is disposed on the vehicle front side of the vessels 18 and extends in the vehicle width direction (the array direction of the vessels 18). Mounting portions 20A that become attached to the connecting portions 30A of the caps 30 are provided on the first pipe 20. The mounting portions 20A are plurally provided in correspondence to the positions of the vessels 18. In the present exemplary embodiment, eleven mounting portions 20A are provided. Furthermore, the mounting portions 20A are equipped with male thread portions disposed projecting toward the vessels 18. The vessels 18 are secured to the first pipe 20 as a result of the openings 30B (the connecting portions 30A) of the caps 30 being screwed onto the male thread portions. Moreover, a flow passage is formed inside the first pipe 20, and the insides of the plural vessels 18 are communicated with each other by this flow passage. Furthermore, plural front mounting pieces 36 are provided on the first pipe 20. Details about the front mounting pieces 36 will be described later.

Here, the lead-out pipe 32 is provided in the vehicle width direction middle section (the middle section in the array direction of the vessels 18) of the first pipe 20. The lead-out pipe 32 is a tube that projects in the vehicle forward direction from the first pipe 20. In the present exemplary embodiment, the lead-out pipe 32 is provided on the mounting portion 20A in the vehicle width direction center of the first pipe 20. The lead-out pipe 32 is led out to the outside through a through hole 46A formed in a peripheral wall portion 46 of the case 22 described later. A valve 34 capable of opening and closing the flow passage in the first pipe 20 is attached to the lead-out pipe 32.

The second pipe 21 is disposed on the vehicle rear side of the vessels 18. The rear end portions of the vessels 18 are coupled to each other in the vehicle width direction by the second pipe 21. Like the first pipe 20, the second pipe 21 includes plural (eleven in the present exemplary embodiment) mounting portions 21A. The mounting portions 21A are equipped with pass-through holes through which the connecting portions 30A of the caps 30 are passed. As shown in FIG. 3, the second pipe 21 is secured to the vessels 18 by screwing bolts 23 into the openings 30B (see FIG. 2) of the connecting portions 30A from outside in the axial direction in a state in which the connecting portions 30A have been passed through the mounting portions 21A. Furthermore, a flow passage is formed inside the second pipe 21, and the insides of the plural vessels 18 are communicated with each other by the flow passage. Moreover, as shown in FIG. 2, plural rear mounting pieces 38 configuring a retention mechanism 61 are provided on the second pipe 21. Details about the rear mounting pieces 38 will be described later.

Here, the vessels 18 and the first pipe 20 are housed in the case 22. The case 22 is formed in a substantially rectangular box-like shape as seen in a plan view and includes a case body 40 and a cover member 42.

The case body 40 is a box whose upper side is open. The case body 40 includes a bottom wall portion 44 and a peripheral wall portion 46. The bottom wall portion 44 is formed of aluminum alloy, for example, and has a substantially rectangular shape with rounded corners as seen in a plan view. Furthermore, mounting holes 44A are formed spaced apart from each other in the outer peripheral portion of the bottom wall portion 44. The bottom wall portion 44 is configured such that it can be fastened to frame members such as rockers by fastening members such as bolts.

The peripheral wall portion 46 is erectly provided on the bottom wall portion 44, is formed of an aluminum alloy extrusion-molded part, and has a substantially rectangular frame-like shape as seen in a plan view. Furthermore, the outer shape of the peripheral wall portion 46 is formed so as to be of a size that surrounds the periphery of the plural vessels 18. In the present exemplary embodiment, the outer shape of the peripheral wall portion 46 is of a size capable of housing the eleven vessels 18.

The peripheral wall portion 46 includes a front wall 48 that extends in the vehicle width direction on the vehicle front side, a rear wall 50 that extends in the vehicle width direction on the vehicle rear side, and a right wall 52 and a left wall 53 that couple both end portions of the front wall 48 and the rear wall 50 to each other in the vehicle front and rear direction. Furthermore, the front wall 48, the rear wall 50, the right wall 52, and the left wall 53 each have a closed cross-sectional structure. This will be described specifically below.

Figure 4:
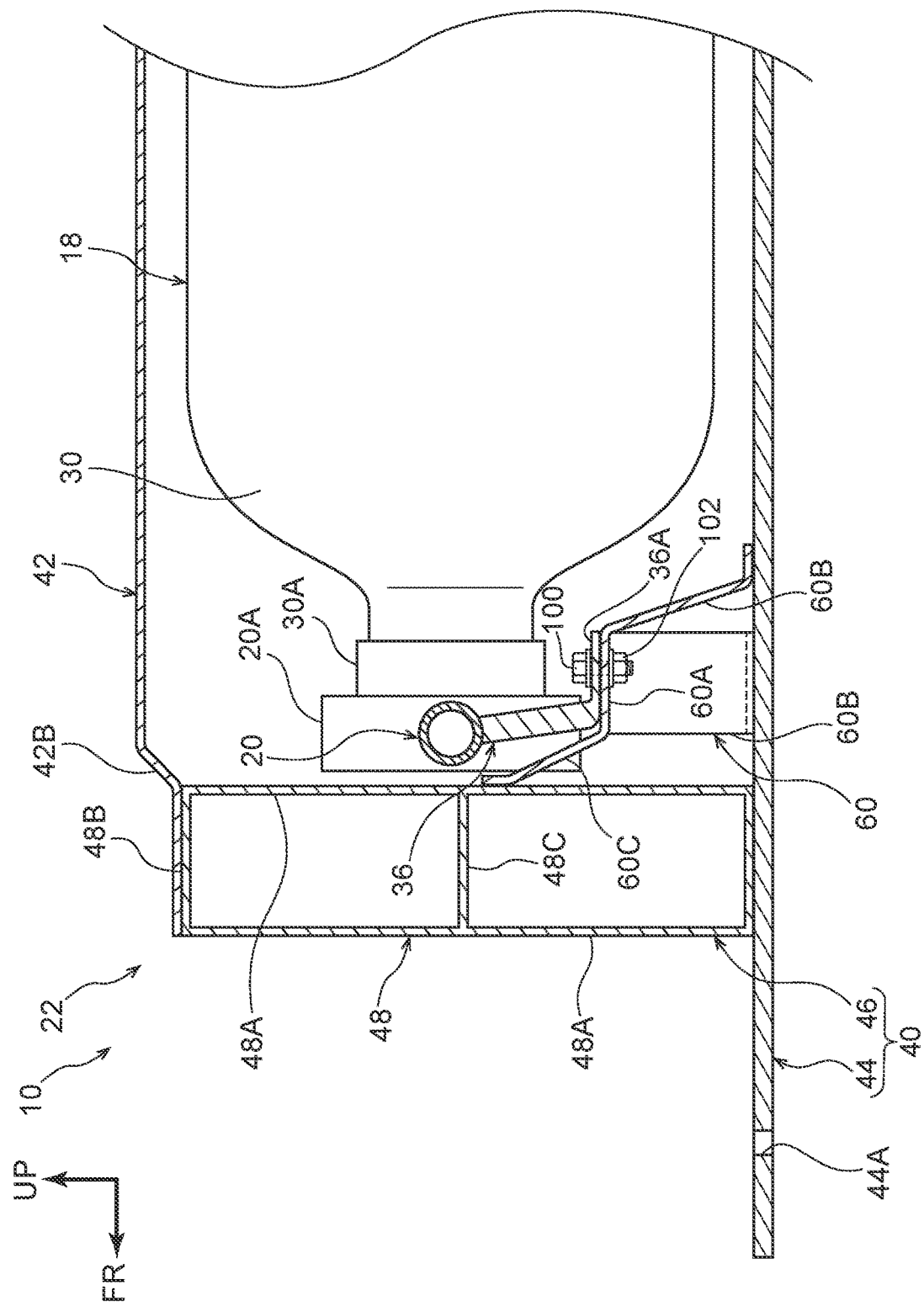
FIG. 4 is an enlarged side view showing the front end portion of the high-pressure vessel unit pertaining to the first exemplary embodiment.

As shown in FIG. 4, the cross-sectional shape of the front wall 48 as seen from the vehicle width direction is formed in a closed cross-sectional shape. Specifically, the front wall 48 includes a front and rear pair of front vertical walls 48A erectly provided on the bottom wall portion 44 in such a way as to be spaced apart from each other in the vehicle front and rear direction, a front upper wall 48B that couples the upper end portions of the front vertical walls 48A to each other in the front and rear direction, and a front middle wall 48C that couples the up and down direction middle sections of the front vertical walls 48A to each other in the front and rear direction.

Furthermore, as shown in FIG. 2, the through hole 46A that runs through the front wall 48 in the vehicle front and rear direction is formed in the vehicle width direction central section of the front wall 48. As shown in FIG. 3, the lead-out pipe 32 provided on the first pipe 20 is led out to the outside of the case 22 through the through hole 46A. Furthermore, the valve 34 capable of opening and closing the flow passage in the first pipe 20 is attached to the lead-out pipe 32. Accordingly, the quantity of fluid flowing inside the flow passage may be controlled. Furthermore, one end portion of a pipe not shown in the drawings is connected to the valve 34, and the other end portion of the pipe is connected to the fuel cell stack 14 or the like.

Figure 5:
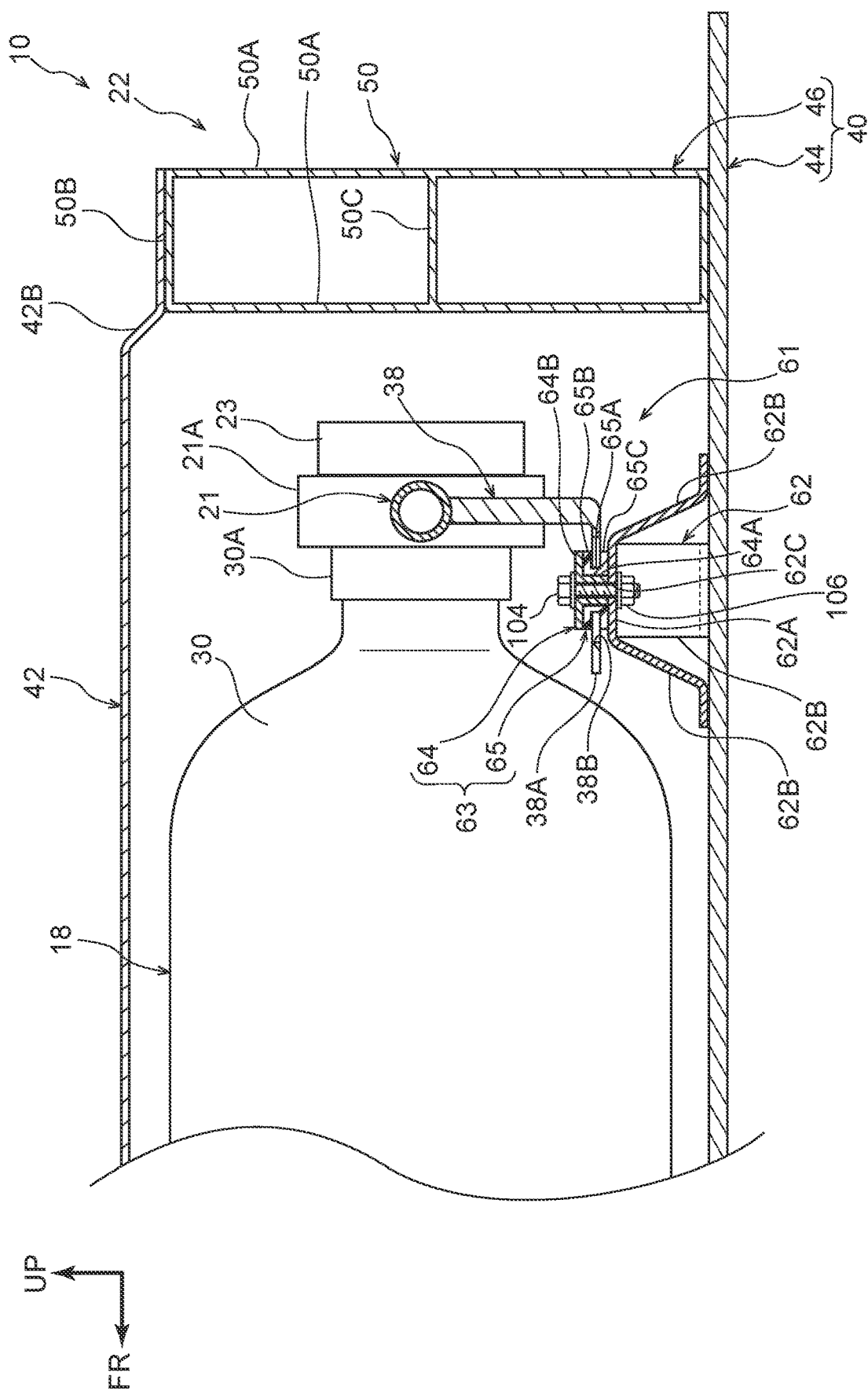
FIG. 5 is an enlarged side view showing the rear end portion of the high-pressure vessel unit pertaining to the first exemplary embodiment.

As shown in FIG. 5, like the front wall 48, the cross-sectional shape of the rear wall 50 as seen from the vehicle width direction is formed in a closed cross-sectional shape. Specifically, the rear wall 50 includes a front and rear pair of rear vertical walls 50A erectly provided on the bottom wall portion 44 in such a way as to be spaced apart from each other in the vehicle front and rear direction, a rear upper wall 50B that couples the upper end portions of the rear vertical walls 50A to each other in the front and rear direction, and a rear middle wall 50C that couples the up and down direction middle sections of the rear vertical walls 50A to each other in the front and rear direction.

As shown in FIG. 2, the cross-sectional shapes of the right wall 52 and the left wall 53 as seen from the vehicle front and rear direction are formed in the same closed cross-sectional shapes of the front wall 48 and the rear wall 50. The right wall 52 includes a right and left pair of right vertical walls 52A, a right upper wall 52B, and a right middle wall 52C. The right and left pair of right vertical walls 52A are erectly provided on the bottom wall portion 44 so as to be spaced apart from each other in the vehicle width direction. The right upper wall 52B couples the upper end portions of the right vertical walls 52A to each other in the vehicle width direction. The right middle wall 52C couples the up and down direction middle sections of the right vertical walls 52A to each other in the vehicle width direction. The left wall 53 includes a right and left pair of left vertical walls 53A, a left upper wall 53B, and a left middle wall 53C. The right and left pair of left vertical walls 53A are erectly provided on the bottom wall portion 44 so as to be spaced apart from each other in the vehicle width direction. The left upper wall 53B couples the upper end portions of the left vertical walls 53A to each other in the vehicle width direction. The left middle wall 53C couples the up and down direction middle sections of the left vertical walls 53A to each other in the vehicle width direction. As described above, the peripheral wall portion 46 is formed of frame members having closed cross-sectional structures.

As shown in FIG. 3, both vehicle width direction sides of the rear end portion of the peripheral wall portion 46 are recess portions 51 recessed in the vehicle forward direction as seen in a plan view (in FIG. 3, only the recess portion 51 on the vehicle left side is shown). For this reason, the length of the inside of the case 22 along the vehicle front and rear direction is shorter at both vehicle width direction end portions than at the vehicle width direction central portion. Due thereto, as described above, the vessels 18 housed on both vehicle width direction sides are shorter in length in the vehicle front and rear direction (axial direction) than the other vessels 18.

As shown in FIG. 2, the cover member 42 is made of aluminum alloy, for example, and is formed in the shape of a flat plate corresponding to the shape of the peripheral wall portion 46. For this reason, recess portions 42A recessed in the vehicle forward direction as seen in a plan view are formed in correspondence to the peripheral wall portion 46 in both vehicle width direction end portions of the rear end portion of the cover member 42. Furthermore, as shown in FIG. 4 and FIG. 5, a step portion 42B is formed in the outer peripheral end portion of the cover member 42. The section of the cover member 42 on the outer peripheral side of the step portion 42B is placed on top of the upper surface of the peripheral wall portion 46 and fastened thereto by fastening members such as bolts. In this way, the opening on the upper side of the case body 40 is closed off by the cover member 42. Note that a gap is provided between the cover member 42 and the vessels 18 to keep noise from being produced by contact between the cover member 42 and the vessels 18.

Here, as shown in FIG. 2, first mounting brackets 60 serving as securing members are provided on the vehicle front side of the bottom wall portion 44. The first mounting brackets 60 are plurally provided spaced apart from each other in the vehicle width direction. In the present exemplary embodiment, three first mounting brackets 60 are provided. Furthermore, the first mounting brackets 60 are provided between adjacent vessels 18.

As shown in FIG. 4, the first mounting brackets 60 are brackets that are joined to the bottom wall portion 44 and the front wall 48 (the peripheral wall portion 46) and support the first pipe 20. Furthermore, the first mounting brackets 60 are each configured to include a support portion 60A, leg portions 60B, and a front extension portion 60C.

The support portion 60A is a flat plate-like part formed in a substantially rectangular shape as seen in a plan view, and is disposed in a position spaced in the vehicle upward direction apart from the bottom wall portion 44. Furthermore, three leg portions 60B extend toward the bottom wall portion 44 from the rear end portion and both vehicle width direction end portions of the support portion 60A (in FIG. 4, only the leg portion 60B extending in the vehicle rearward direction and the leg portion 60B extending in the vehicle rightward direction are shown). The leg portions 60B extend obliquely downward from the support portion 60A toward the bottom wall portion 44. The lower end portions of the leg portions 60B are bent along the bottom wall portion 44 and are joined to the bottom wall portion 44.

The front extension portion 60C extends obliquely upward from the front end portion of the support portion 60A toward the peripheral wall portion 46. The front end portion of the front extension portion 60C is bent upward along the peripheral wall portion 46 and is joined to the front wall 48 (the peripheral wall portion 46).

The front mounting pieces 36 are provided on the first pipe 20. The front mounting pieces 36 extend downward from between adjacent mounting portions 20A on the first pipe 20. Flanges 36A bent in the vehicle rearward direction are provided on the lower end portions of the front mounting pieces 36. The flanges 36A are placed on top of the support portions 60A of the first mounting brackets 60 and are fastened thereto with bolts 100 and nuts 102.

As shown in FIG. 2, second mounting brackets 62 serving as mounting brackets configuring the retention mechanism 61 are provided on the vehicle rear side of the bottom wall portion 44. The second mounting brackets 62 are plurally provided in such a way as to be spaced apart from each other in the vehicle width direction. In the present exemplary embodiment, three second mounting brackets 62 are provided (in FIG. 2, only two second mounting brackets 62 are shown). Furthermore, the second mounting brackets 62 are provided in positions (between adjacent vessels 18) corresponding in the vehicle width direction to the first mounting brackets 60. As shown in FIG. 5, the retention mechanism 61 includes the second mounting brackets 62 and the rear mounting pieces 38 provided on the second pipe 21.

The second mounting brackets 62 are brackets that are joined to the bottom wall portion 44 and support the second pipe 21. Furthermore, the second mounting brackets 62 are each configured to include a support portion 62A and leg portions 62B.

The support portion 62A is a flat plate-like part formed in a substantially rectangular shape as seen in a plan view and is disposed in a position spaced in the vehicle upward direction apart from the bottom wall portion 44. Furthermore, a first mounting hole 62C that runs through the support portion 62A in its thickness direction is formed in the central portion of the support portion 62A.

Four leg portions 62B extend toward the bottom wall portion 44 from the front, rear, right, and left end portions of the support portion 62A. The leg portions 62B extend obliquely downward from the support portion 62A toward the bottom wall portion 44. The lower end portions of the leg portions 62B are bent along the bottom wall portion 44 and are joined to the bottom wall portion 44.

The rear mounting pieces 38 extend downward from between adjacent mounting portions 21A on the second pipe 21. Flanges 38A bent in the vehicle forward direction are provided on the lower end portions of the rear mounting pieces 38. The flanges 38A extend in the vehicle front and rear direction between adjacent vessels 18.

Here, second mounting holes 38B are formed in the flanges 38A. The second mounting holes 38B are long holes whose longitudinal direction is aligned with the axial direction of the vessels 18. Bolts 104 are passed through the first mounting holes 62C formed in the support portions 62A of the second mounting brackets 62 and the second mounting holes 38B in the flanges 38A. The bolts 104 are screwed into nuts 106 on the lower surface sides of the support portions 62A, whereby both (the support portions 62A and the flanges 38A) are fastened to each other. Note that, in the present exemplary embodiment, the bolts 104 and the nuts 106 correspond to "fastening members" of the present disclosure.

Furthermore, resin collars 63 configuring the retention mechanism 61 are provided between the second mounting brackets 62 and the rear mounting pieces 38. The resin collars 63 are jointly fastened to the support portions 62A and the flanges 38A.

The resin collars 63 are each configured by a collar upper portion 64 and a collar lower portion 65. The collar upper portion 64 includes an upper tubular portion 64A that extends along the axial direction of the bolt 104. The inner diameter of the upper tubular portion 64A is formed a little larger than the shaft portion of the bolt 104, and the shaft portion of the bolt 104 is passed through the upper tubular portion 64A. Furthermore, a flange portion 64B extends outward in the radial direction from the upper end portion of the upper tubular portion 64A. The flange portion 64B is formed larger in diameter than the second mounting hole 38B and is configured so that the resin collar 63 does not come out from the second mounting hole 38B (see FIG. 6A and FIG. 6B).

The collar lower portion 65 includes a lower tubular portion 65A that extends along the axial direction of the bolt 104. The upper tubular portion 64A is passed through the lower tubular portion 65A. Furthermore, an upper flange portion 65B extends outward in the radial direction from the upper end portion of the lower tubular portion 65A, and the upper flange portion 65B is sandwiched between the flange portion 64B of the collar upper portion 64 and the flange 38A of the rear mounting piece 38. Moreover, a lower flange portion 65C extends outward in the radial direction from the lower end portion of the lower tubular portion 65A. The lower flange portion 65C is sandwiched between the flange 38A of the rear mounting piece 38 and the support portion 62A of the second mounting bracket 62.

As described above, the flanges 38A of the rear mounting pieces 38 are sandwiched between the upper flange portions 65B and the lower flange portions 65C of the collar lower portions 65, and the distance between the upper flange portions 65B and the lower flange portions 65C is designed to be slightly larger than the thickness of the flanges 38A. For this reason, the rear mounting pieces 38 are movable in the axial direction of the vessels 18 relative to the second mounting brackets 62. That is, in the present exemplary embodiment, the portions of the vessels 18 on the other side in the axial direction are retained, such that they are movable in the axial direction relative to the case 22, by the retention mechanism 61 (the rear mounting pieces 38, the second mounting brackets 62, and the resin collars 63).

Here, a case will be considered where the vessels 18 have expanded in their axial direction from a state in which the bolts 104 are in contact with the hole edges on the vehicle rear sides of the second mounting holes 38B (long holes) in the flanges 38A of the rear mounting pieces 38 as shown in FIG. 6A. In this case, as shown in FIG. 4, the end portions of the vessels 18 on the one side in the axial direction are immovable because the front mounting pieces 36 are secured to the first mounting brackets 60. In contrast, as shown in FIG. 5, the end portions of the vessels 18 on the other side in the axial direction are retained such that the rear mounting pieces 38 are movable in the axial direction as described above, so as indicated by arrow A1 in FIG. 6B, the rear mounting pieces 38 move toward the other side in the axial direction (the vehicle rearward direction) as the vessel 18 expands. In this way, expansion of the vessels 18 in their axial direction is allowed. Furthermore, in a case where the vessels 18 have contracted in their axial direction, the rear mounting pieces 38 conversely move toward the one side in the axial direction (the vehicle forward direction) from the state shown in FIG. 6B to the state shown in FIG. 6A to allow contraction of the vessels 18 in their axial direction.

Note that the axial direction length of the second mounting holes 38B that are long holes and the positions of the rear mounting pieces 38 when the vessels 18 are at a normal temperature are designed in consideration of the expansion and contraction of the vessels 18.

Next, the actions of the present exemplary embodiment will be described.

The high-pressure vessel unit 10 of the present exemplary embodiment includes the plurally arrayed cylindrical vessels 18 as shown in FIG. 2. Furthermore, the end portions of the vessels 18 on the one side in the axial direction are coupled to each other by the pipe 20, and the end portions of the vessels 18 on the other side in the axial direction are coupled to each other by the pipe 21. The insides of the vessels 18 are communicated with each other by the pipes 20 and 21. Moreover, the lead-out pipe 32 is provided on the pipe 20, and the valve 34 is attached to the lead-out pipe 32. Due to the above, the plural vessels 18 may be unitized and may function as a single high-pressure vessel, so that capacity may be ensured.

Furthermore, in the present exemplary embodiment, the end portions of the vessels 18 on the one side in the axial direction are secured to the bottom wall portion 44 of the case 22 via the first pipe 20, and the portions of the vessels 18 on the other side in the axial direction are retained, such that they are movable in the axial direction relative to the case 22, by the retention mechanism 61. Due to the above, in a case where the vessels 18 have expanded or contracted, the portions of the vessels 18 on the other side in the axial direction move, but the end portions of the vessels 18 on the one side in the axial direction to which the valve 34 is connected do not move relative to the case 22. As a result, the load on the valve 34 may be reduced when the vessels 18 expand or contract in their axial direction. As described above, in the high-pressure vessel unit 10 of the present exemplary embodiment, shock resistance performance may be maintained and the load on the valve 34 may be reduced when the vessels 18 expand or contract in their axial direction.

Moreover, in the present exemplary embodiment, since the portions of the vessels 18 on the other side in the axial direction are coupled to each other by the second pipe 21, and the second pipe 21 is retained such that the second pipe 21 is movable relative to the case 22, there is no need to retain the vessels 18 themselves such that the vessels 18 are individually movable. That is, the retention mechanism 61 does not become complex even if the number of the vessels 18 is increased.

Moreover, in the present exemplary embodiment, the second mounting holes 38B are long holes. Due thereto, when the vessels 18 expand in their axial direction, the second pipe 21 moves together with the rear mounting pieces 38 toward the other side in the axial direction according to how much the vessels 18 have expanded. When the vessels 18 contract in their axial direction, the second pipe 21 moves together with the rear mounting pieces 38 toward the one side in the axial direction according to how much the vessels 18 have contracted. In this way, the expansion or contraction of the vessels 18 may be allowed with a simple configuration.

Furthermore, in the present exemplary embodiment, the second mounting brackets 62 and the rear mounting pieces 38 are provided between adjacent vessels 18. Due thereto, there is no need to ensure a dedicated space for providing the retention mechanism 61 on the axial direction other side of the vessels 18. That is, the expansion or contraction of the vessels 18 in their axial direction may be allowed without increasing the size of the case 22.

Moreover, in the present exemplary embodiment, the vessels 18, the first pipe 20, and the second pipe 21 are housed in the box-like case 22. Because of this, the vessels 18, the first pipe 20, and the second pipe 21 may be protected and shock resistance performance may be ensured. Furthermore, the valve 34 is attached to the lead-out pipe 32 that is led out to the outside of the case 22, so the valve 34 can be accessed even in a state in which the cover member 42 of the case 22 is closed. That is, there is no need to open the cover member 42 when detaching the tube or the like from the valve 34, and serviceability can be improved in comparison with a structure where the valve 34 is provided inside the case 22.

Moreover, in the present exemplary embodiment, the lead-out pipe 32 is provided in the array direction middle section of the vessels 18. Accordingly, when charging the plural vessels 18 with fuel through the first pipe 20, the fuel flows substantially evenly to each of the vessels 18 through the lead-out pipe 32 provided in the middle section of the first pipe 20. For this reason, the quantity of fuel with which each of the vessels 18 is charged can be kept from becoming uneven. Furthermore, when supplying to the outside the fuel with which the vessels 18 have been charged, about the same quantity of fuel can be supplied from each of the vessels 18. Here, in a case where the pressure inside the vessels 18 is extremely high, the temperature greatly fluctuates as the pressure changes, but in the present exemplary embodiment the quantity of fuel inside each of the vessels 18 changes about the same extent. For this reason, the temperature of each of the vessels 18 may be kept from varying inside the case 22 as the pressure inside the vessels 18 changes.

Furthermore, in the present exemplary embodiment, the case 22 includes the case body 40 and the cover member 42. Accordingly, foreign matter and so forth may be kept from entering the inside of the case body 40. Moreover, the vessels 18 may be protected by the cover member 42 also with respect to shocks from the vehicle upper side. Moreover, the peripheral wall portion 46 of the case body 40 has a closed cross-sectional structure. Accordingly, the peripheral wall portion 46 may be kept from becoming deformed in comparison with a structure where the peripheral wall portion 46 is formed of a plate-like member. As a result, shocks that are input to the vessels 18 inside the case 22 may be reduced. That is, foreign matter may be kept from entering the case 22, and the shock resistance performance of the case 22 may be improved.

[Second Exemplary Embodiment]

Next, a high-pressure vessel unit 70 pertaining to a second exemplary embodiment will be described with reference to FIG. 7 to FIG. 9. Note that, regarding structures that are the same as those in the first exemplary embodiment, the same reference signs will be assigned thereto and description thereof will be appropriately omitted.

Figure 7:
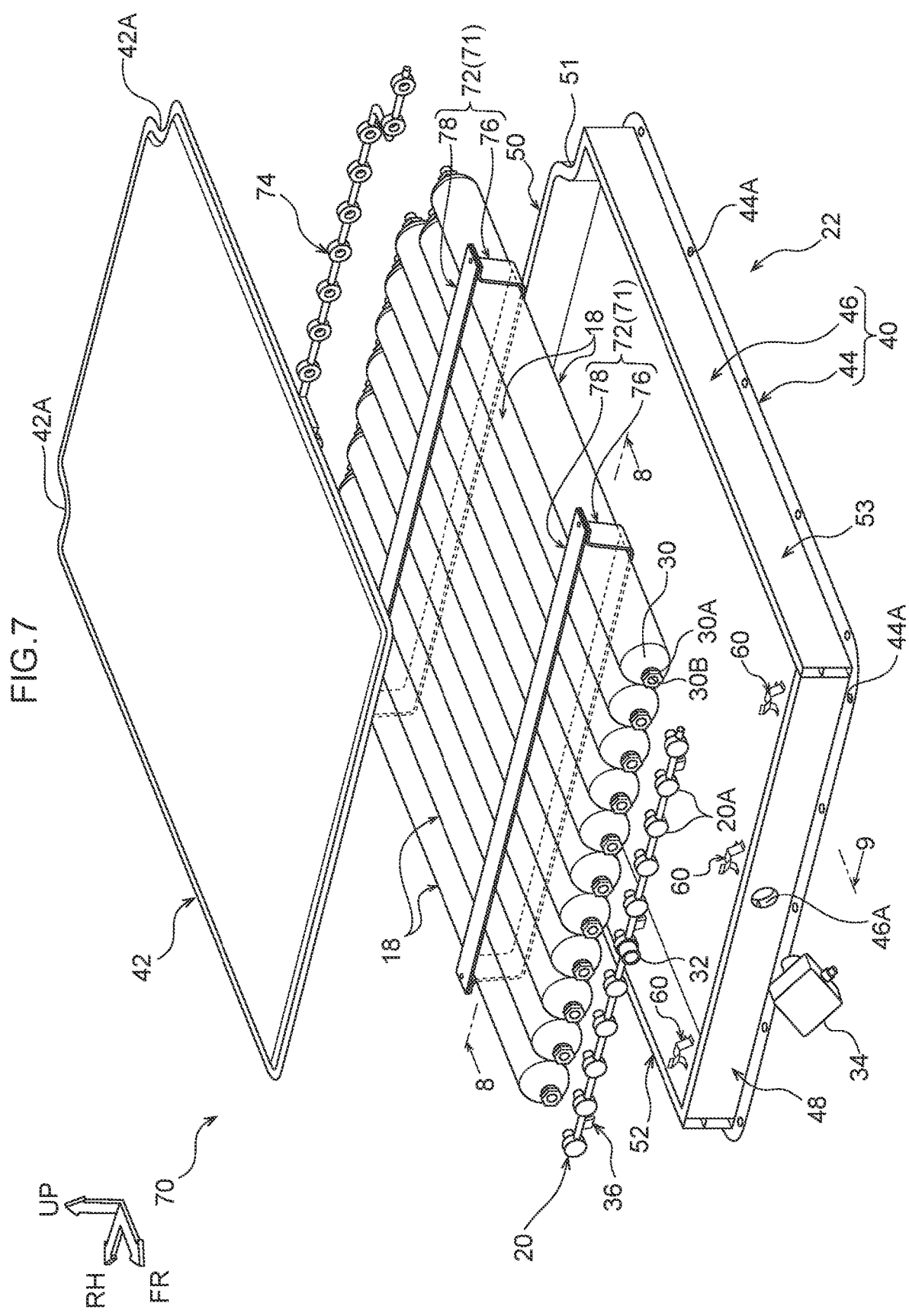
FIG. 7 is an exploded perspective view of a high-pressure vessel unit pertaining to a second exemplary embodiment.

As shown in FIG. 7, the high-pressure vessel unit 70 of the present exemplary embodiment includes eleven vessels 18 housed in the case 22. The case 22 includes the case body 40 and the cover member 42, and the case body 40 includes the bottom wall portion 44 and the peripheral wall portion 46. Furthermore, the first mounting brackets 60 are provided on the bottom wall portion 44, but the second exemplary embodiment differs from the first exemplary embodiment in that the second mounting brackets 62 are not provided. Moreover, support bands 72 configuring a retention mechanism 71 bridge the peripheral wall portion 46.

Furthermore, the first pipe 20 is disposed on the vehicle front side of the vessels 18, and the end portions (vehicle front end portions) of the eleven vessels 18 on the one side in the axial direction are coupled to each other by the first pipe 20. A second pipe 74 is disposed on the vehicle rear side of the vessels 18, and the end portions (vehicle rear end portions) of the eleven vessels 18 on the other side in the axial direction are coupled to each other by the second pipe 74. Note that the second pipe 74 has the same configuration as the second pipe 21 of the first exemplary embodiment except that it is not equipped with the rear mounting pieces 38.

Here, the retention mechanism 71 of the present exemplary embodiment includes two support bands 72 that extend in the array direction of the vessels 18 (vehicle width direction) and bridge the case 22. The support bands 72 each include a band body 76 and a restraining portion 78.

Figure 8:
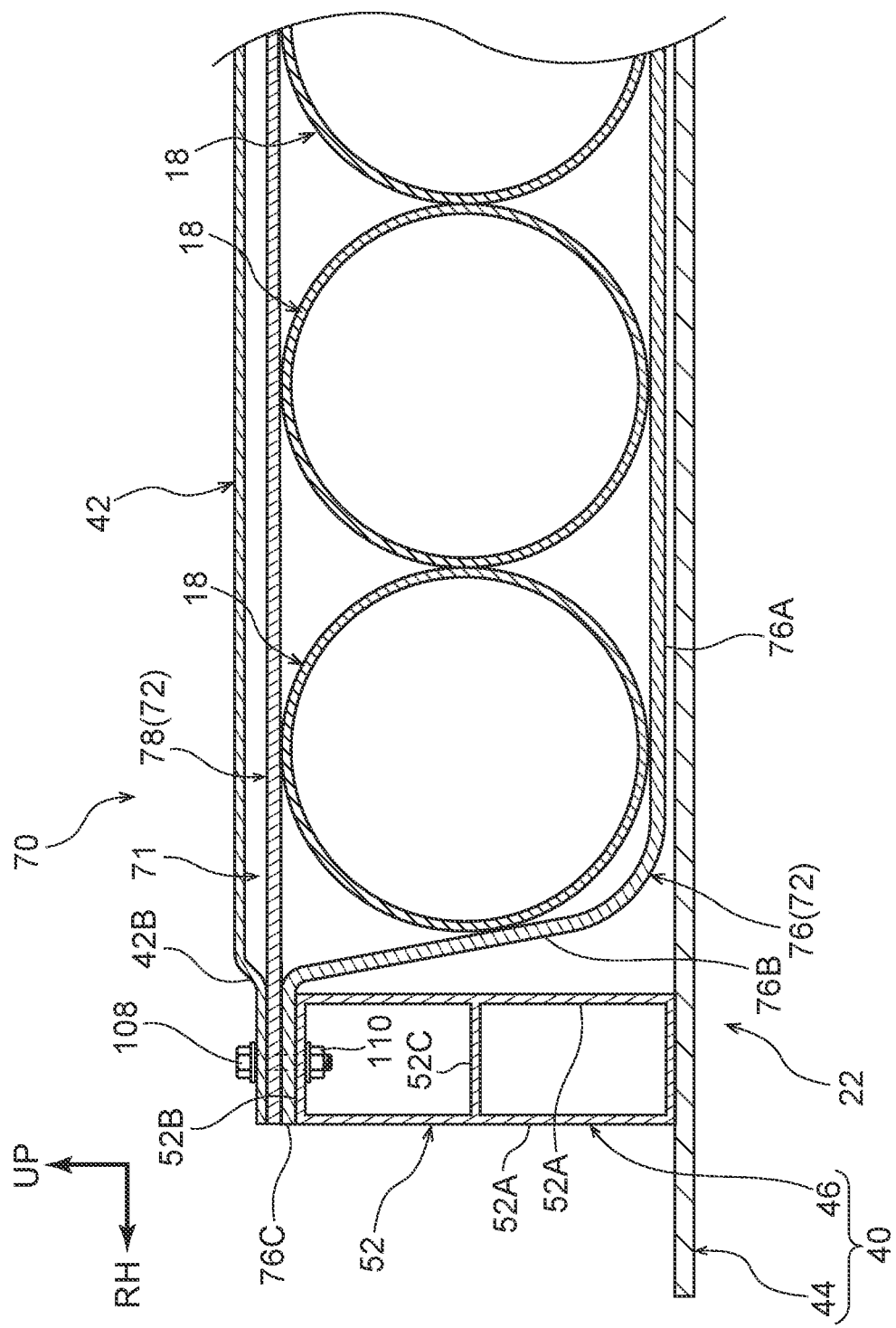
FIG. 8 is a sectional view showing a state in which the high-pressure vessel unit pertaining to the second exemplary embodiment has been cut along line 8-8 of FIG. 7.

As shown in FIG. 8, the band body 76 is formed in the shape of a flat hat whose vehicle upper side is open as seen from the axial direction of the vessels 18. The band body 76 includes a bottom portion 76A that extends in the vehicle width direction along the bottom wall portion 44. Furthermore, arm portions 76B extend in the vehicle upward direction from both vehicle width direction end portions of the bottom portion 76A, and flange portions 76C extend outward in the vehicle width direction from the upper end portions of the arm portions 76B. The flange portions 76C are placed on top of the upper surface (the right upper wall 52B and the left upper wall 53B) of the peripheral wall portion 46 of the case body 40.

The restraining portion 78 is a long plate extending in the vehicle width direction and bridges the one flange portion 76C and the other flange portion 76C. Both vehicle width direction end portions of the restraining portion 78 are fastened, together with the flange portions 76C, to the peripheral wall portion 46 by bolts 108 and nuts 110.

Figure 9:
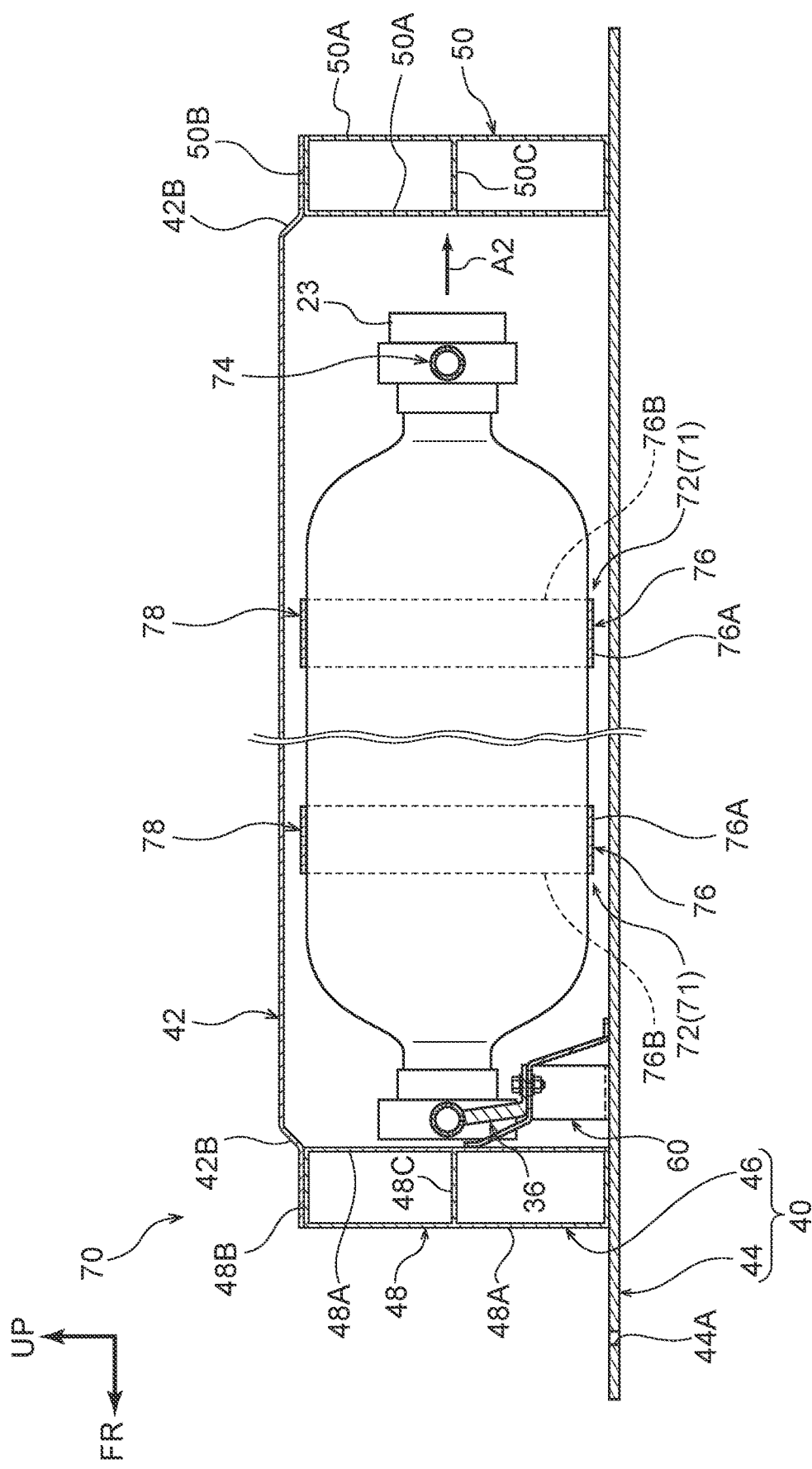
FIG. 9 is a sectional view showing a state in which the high-pressure vessel unit pertaining to the second exemplary embodiment has been cut along line 9-9 of FIG. 7.

Here, as shown in FIG. 9, the vessels 18 are slidably supported by the support bands 72. Specifically, the vessels 18 are supported by the bottom portions 76A of the band bodies 76 in a state in which the vessels 18 are suspended from the bottom wall portion 44, and in this state the portions of the vessels 18 on the other side (vehicle rear side) in the axial direction can slide in the axial direction.

Next, the actions of the present exemplary embodiment will be described.

In the high-pressure vessel unit 70 of the present exemplary embodiment, when the vessels 18 expand in their axial direction, the end portions of the vessels 18 on the other side in the axial direction slide toward the other side in the axial direction according to how much the vessels 18 have expanded (see arrow A2). Furthermore, when the vessels 18 contract in their axial direction, the end portions of the vessels 18 on the other side in the axial direction slide toward the one side (opposite side of arrow A2) in the axial direction according to how much the vessels 18 have contracted. In this way, the expansion or contraction of the vessels 18 in their axial direction can be allowed. Other effects are the same as those in the first exemplary embodiment.

[Third Exemplary Embodiment]

Next, a high-pressure vessel unit 80 pertaining to a third exemplary embodiment will be described with reference to FIG. 10 and FIG. 11. Note that, regarding structures that are the same as those in the first exemplary embodiment and the second exemplary embodiment, the same reference signs will be assigned thereto and description thereof will be appropriately omitted.

Figure 10:
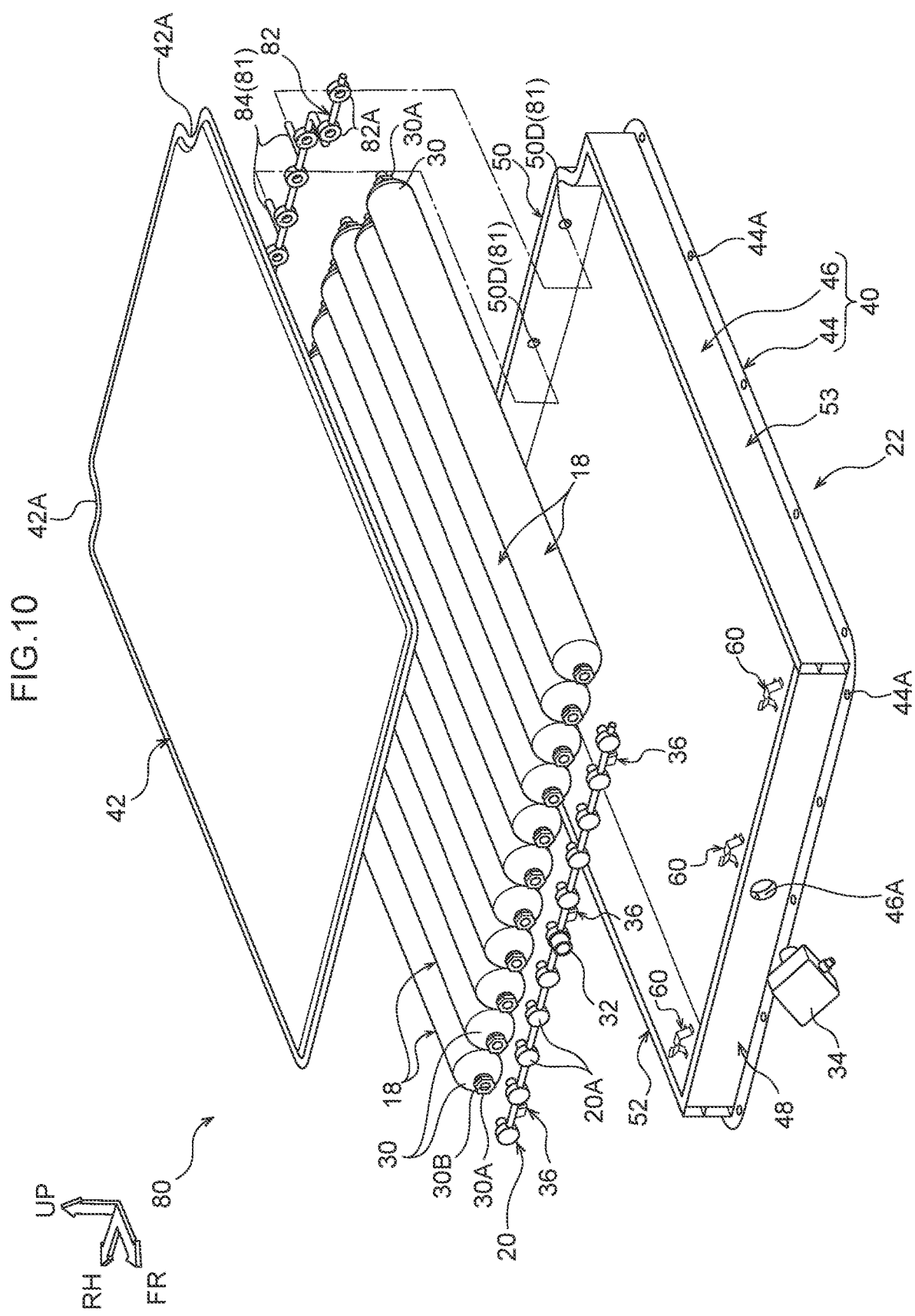
FIG. 10 is an exploded perspective view of a high-pressure vessel unit pertaining to a third exemplary embodiment.

As shown in FIG. 10, the high-pressure vessel unit 80 of the present exemplary embodiment includes eleven vessels 18 housed in the case 22. The case 22 includes the case body 40 and the cover member 42, and the case body 40 includes the bottom wall portion 44 and the peripheral wall portion 46. Furthermore, the first mounting brackets 60 are provided on the bottom wall portion 44, but the third exemplary embodiment differs from the first exemplary embodiment in that the second mounting brackets 62 are not provided. Furthermore, pass-through holes 50D configuring a retention mechanism 81 are formed in the rear wall 50 of the peripheral wall portion 46 (the peripheral wall portion 46 opposing the end portions of the vessels 18 on the other side in the axial direction).

Furthermore, the first pipe 20 is disposed on the vehicle front side of the vessels 18, and the end portions (vehicle front end portions) of the eleven vessels 18 on the one side in the axial direction are coupled to each other by the first pipe 20. A second pipe 82 is disposed on the vehicle rear side of the vessels 18, and the end portions (vehicle rear end portions) of the eleven vessels 18 on the other side in the axial direction are coupled to each other by the second pipe 82.

Here, projecting portions 84 configuring the retention mechanism 81 are provided on the second pipe 82. The projecting portions 84 and the pass-through holes 50D formed in the rear wall 50 will be described below.

The second pipe 82 includes mounting portions 82A in positions opposing the vessels 18. The mounting portions 82A are equipped with pass-through holes through which the connecting portions 30A of the caps 30 are passed. The projecting portions 84 project toward the other side (vehicle rear side) in the axial direction from between adjacent mounting portions 82A.

As shown in FIG. 11, the projecting portions 84 are rod-like portions that project from the second pipe 82 and are passed through the pass-through holes 50D formed in the rear wall 50. The pass-through holes 50D are formed in positions in the rear wall 50 corresponding to the projecting portions 84. In the present exemplary embodiment, the pass-through holes 50D are formed in the front and rear pair of rear vertical walls 50A configuring the rear wall 50. Furthermore, the hole diameter of the pass-through holes 50D is formed slightly larger than the projecting portions 84, so the projecting portions 84 are movable in the axial direction of the vessels 18. The projecting portions 84 are supported in the pass-through holes 50D. That is, the end portions of the vessels 18 on the other side in the axial direction are supported by the rear wall 50 via the second pipe 82.

Next, the actions of the present exemplary embodiment will be described.

In the high-pressure vessel unit 80 of the present exemplary embodiment, when the vessels 18 expand in their axial direction, the end portions of the vessels 18 on the other side in the axial direction slide toward the other side in the axial direction according to how much the vessels 18 have expanded (see arrow A3). That is, the pass-through length of the projecting portions 84 becomes longer. Furthermore, when the vessels 18 contract in their axial direction, the projecting portions 84 move toward the one side (opposite side of arrow A3) in the axial direction according to how much the vessels 18 have contracted. That is, the pass-through length of the projecting portions 84 becomes shorter. In this way, the expansion or contraction of the vessels 18 in their axial direction may be allowed. Other effects are the same as those in the first exemplary embodiment.

High-pressure vessel units pertaining to the first exemplary embodiment to the third exemplary embodiment have been described above. However, they can of course be implemented in various ways in a range that does not depart from the gist of the present disclosure. For example, in the first exemplary embodiment, as shown in FIG. 5, the second mounting holes 38B formed in the flanges 38A of the rear mounting pieces 38 are long holes. However, the high-pressure vessel unit 10 is not limited to this. The first mounting holes 62C formed in the support portions 62A of the second mounting brackets 62 may also be long holes. In this case, the same effects as in the first exemplary embodiment may be obtained since the rear mounting pieces 38 move in the axial direction along the long holes together with the resin collars 63 as the vessels 18 expand or contract in their axial direction.

Furthermore, in the first exemplary embodiment, the resin collars 63 are provided between the flanges 38A of the rear mounting pieces 38 and the support portions 62A of the second mounting brackets 62. However, the high-pressure vessel unit 10 is not limited to this. For example, in a case where frictional resistance when the rear mounting pieces 38 slide is low, the resin collars 63 may also be eliminated. Furthermore, the resin collars 63 may also be configured by just the collar lower portions 65 without providing the collar upper portions 64.

Moreover, as shown in FIG. 2, in the above exemplary embodiments the vessels 18 are each configured to include the shell portion 24, the first reinforcement layer 26, the caps 30, and the second reinforcement layer 28. However, the vessels 18 are not limited to this. For example, the vessels 18 may also have a structure where the second reinforcement layer 28 is not provided and the case 22 is reinforced to ensure shock resistance performance. Moreover, the materials and fiber directions of the first reinforcement layer 26 and the second reinforcement layer 28 may also be appropriately changed depending on the shock resistance performance required of the vessels 18.

Moreover, in the above exemplary embodiments, the case 22 is configured by the case body 40 and the cover member 42. However, the case 22 is not limited to this. For example, the case 22 may also be configured by just the case body 40 without providing the cover member 42. Furthermore, the case 22 may also be given a structure where the peripheral wall portion 46 is tightly adhered to the floor panel 16 so that the floor panel 16 is made to function as a cover member for the case body 40.

Moreover, the way the vessels 18 are arrayed and the shape of the case 22 are not particularly limited. For example, in the above exemplary embodiments the vessels 18 are arrayed in one tier in the vehicle width direction, but vessels 18 may also be placed on top of these vessels 18 to create a two-tier configuration.

What is claimed is:

1. A high-pressure vessel unit comprising:
a box-like case;
a plurality of cylindrical vessels arrayed inside the case, each vessel including an opening at an end portion on one side of the vessel in an axial direction;
a coupling member that connects the openings to couple the plurality of vessels with each other and that includes a flow passage that communicates the insides of the plurality of vessels with each other;
a lead-out pipe that leads out to the outside of the case from the coupling member through a through hole formed in the case, the lead-out pipe being attached with a valve capable of opening and closing the flow passage;
securing members that secure the coupling member to the case; and
a retention mechanism that retains a portion of each of the plurality of vessels at an other side of the end portion in the axial direction such that the portion of each of the plurality of vessels at the other side are movable in the axial direction relative to the case.

2. The high-pressure vessel unit according to claim 1, wherein:
the coupling member is a first pipe that couples the end portions of the plurality of vessels on the one side in the axial direction with each other;
end portions of the plural vessels on the other side in the axial direction are coupled to each other by a second pipe; and
the retention mechanism retains the second pipe such that the second pipe is movable relative to the case.

3. The high-pressure vessel unit according to claim 2, wherein:
the retention mechanism includes:
mounting brackets that are provided on the case and in which first mounting holes are formed,
mounting pieces that are provided on the second pipe and in which second mounting holes are formed, and
fastening members that are passed through the first mounting holes and the second mounting holes in a state in which the mounting brackets and the mounting pieces are placed on top with each other and are fastened to each other, and the first mounting holes or the second mounting holes are long holes whose longitudinal direction are aligned with the axial direction of the plurality of vessels.

4. The high-pressure vessel unit according to claim 3, wherein the mounting brackets and the mounting pieces are provided between adjacent vessels.

5. The high-pressure vessel unit according to claim 1, wherein:
   the retention mechanism includes support bands that extend in an array direction of the plurality of vessels and bridge the case, and
   the plurality of vessels are supported by the support bands such that each of the plurality of vessels may freely slide.

6. The high-pressure vessel unit according to claim 2, wherein the retention mechanism includes:
   pass-through holes formed in a peripheral wall portion of the case that opposes the end portions of the vessels on the other side in the axial direction; and
   projecting portions that project from the second pipe and are passed through the pass-through holes such that the projecting portions are movable in the axial direction of the vessels.

7. The high-pressure vessel unit according to claim 1, wherein the case includes:
   a case body equipped with a bottom wall portion and a frame-like peripheral wall portion that is erectly provided on the bottom wall portion and surrounds the periphery of the plurality of vessels; and
   a cover member.

\* \* \* \* \*